United States Patent
Rauch et al.

(10) Patent No.: US 8,463,012 B2
(45) Date of Patent: Jun. 11, 2013

(54) SYSTEM FOR COMPARISON OF MEDICAL IMAGES

(75) Inventors: John Christopher Rauch, Warwick, RI (US); John Baumgart, Hoffman Estates, IL (US)

(73) Assignee: Siemens Medical Solutions USA, Inc., Malvern, PA (US)

( * ) Notice: Subject to any disclaimer, the term of this patent is extended or adjusted under 35 U.S.C. 154(b) by 132 days.

(21) Appl. No.: 13/273,439

(22) Filed: Oct. 14, 2011

(65) Prior Publication Data
US 2013/0094734 A1    Apr. 18, 2013

(51) Int. Cl.
  G06K 9/00    (2006.01)
  A61B 6/00    (2006.01)
  A61K 49/04   (2006.01)

(52) U.S. Cl.
  USPC ............................ 382/130; 378/4; 424/9.4

(58) Field of Classification Search
  USPC ............ 382/128, 129, 130, 131, 132, 133, 382/134, 218; 378/4, 8, 21–27, 101, 901; 424/9.4; 600/407, 410, 425, 427; 128/920, 128/922
  See application file for complete search history.

(56) References Cited

U.S. PATENT DOCUMENTS

| | | | |
|---|---|---|---|
| 5,734,754 A | 3/1998 | Parker | |
| 7,187,810 B2* | 3/2007 | Clune et al. | 382/294 |
| 7,298,884 B2 | 11/2007 | Jeunehomme et al. | |
| 7,403,810 B2* | 7/2008 | Li et al. | 600/419 |
| 7,519,412 B2* | 4/2009 | Mistretta | 600/407 |
| 7,545,901 B2 | 6/2009 | Mistretta | |
| 2005/0259857 A1 | 11/2005 | Jeunehomme et al. | |
| 2007/0009080 A1 | 1/2007 | Mistretta | |
| 2008/0009698 A1 | 1/2008 | Boese | |
| 2008/0247503 A1 | 10/2008 | Lauritsch | |
| 2008/0317323 A1 | 12/2008 | Kinnstatter et al. | |
| 2009/0016587 A1 | 1/2009 | Strobel | |
| 2009/0090873 A1 | 4/2009 | Sapp et al. | |
| 2009/0297004 A1 | 12/2009 | Baumgart | |
| 2010/0030572 A1 | 2/2010 | Von Berg et al. | |
| 2010/0034446 A1 | 2/2010 | Zhu et al. | |
| 2010/0053209 A1 | 3/2010 | Rauch | |
| 2010/0259550 A1 | 10/2010 | Baumgart et al. | |

FOREIGN PATENT DOCUMENTS

| | | |
|---|---|---|
| DE | 102007028226 | 12/2008 |
| DE | 102009024765 | 12/2010 |

OTHER PUBLICATIONS

Co-pending U.S. Appl. No. 13/026,417, filed Feb. 14, 2011.

* cited by examiner

*Primary Examiner* — Abolfazl Tabatabai
(74) *Attorney, Agent, or Firm* — Alexander J Burke

(57) ABSTRACT

A system automatically processes different medical image sequences facilitating comparison of the sequences in adjacent respective display areas. An image data processor, identifies first and second mask images of first and second image sequences respectively as images preceding introduction of contrast agent and determines a translational shift between the first and second mask images. The image data processor transforms data representing individual images of at least one of the first image sequence and the second image sequence in response to the determined translational shift to reduce misalignment of the individual images of the first image sequence relative to the individual images of the second image sequence. A display presents first and second image sequences corrected for mis-alignment, in substantially adjacent display areas to facilitate user comparison.

33 Claims, 19 Drawing Sheets

Figure 16

| | | |
|---|---|---|
| First | Time to Max Blush: | 5.67 sec |
| | Time to Washout: | 11.33 sec |
| Second | Time to Max Blush: | 4.85 sec (-1.17 sec)(79.4%) |
| | Time to Washout: | 10.17 sec (-1.16 sec)(89.8%) |
| Third | Time to Max Blush: | 4.17 sec (-1.50 sec)(73.5%) |
| | Time to Washout: | n/a (n/a) (n/a) |

944

SYSTEM FOR COMPARISON OF MEDICAL IMAGES

FIELD OF THE INVENTION

This invention concerns a system for automatically processing different medical image sequences facilitating comparison of the sequences in adjacent display areas for use in Angiography or another medical procedure.

BACKGROUND OF THE INVENTION

Angiographic imaging including digitally subtracted angiography (DSA) and non-DSA imaging is used in interventional therapy procedures for diagnosis, treatment assessment, and procedure documentation. DSA imaging involves acquiring a reference image (called a mask) which contains only static background detail and is acquired before injection of a contrast agent (e.g., an X-ray opaque dye) into patient anatomy. In order to remove static background detail from images, a mask image is subtracted from subsequent images acquired when a contrast agent is in patient blood which yields a clear picture of blood vessels filled with the contrast agent. Known systems enable a user to review two different multiple frame image sequences by observing them independently simultaneously and synchronously on the same system or multiple different systems. Slight patient movement during the course of a procedure causes mis-alignment between two angiographic images acquired at different times during a procedure using the same imaging system position. Pixel positions in one image do not automatically correlate to the same pixel positions in another image. Also a slight change in the X-ray power values used to acquire the two images affects luminance intensity values obtained. The resultant difference in the display of the two images can lead to incorrect interpretations. Further, comparison of angiographic images usually involves an evaluation of a contrast agent bolus as it travels through the vasculature. In this evaluation, the timing of the contrast agent flow is a clinical parameter that a physician needs observe and understand. Known systems typically are limited to support manual synchronization of the contrast agent flow times of reviewed images.

In an embolization procedure, a treatment is deemed complete when the flow of contrast agent into a portion of imaged anatomy is reduced or eliminated altogether. In some cases, the flow is completely blocked to an area or a specific pathway (e.g., due to a tumor, fibroid, or arteriovenous malformation (AVM) embolization). In this case a user assesses the completion of the procedure by the lack of contrast agent flowing into a specific region. In other cases, a user attempts to partially embolize a portion of the anatomy (e.g. diffuse tumor embolization in the liver, where a proportion of the liver is required to remain viable). For partial embolization procedures a different metric for assessing the completion of the treatment is required that assesses the reduction in the amount of contrast agent in a specific region between two DSA images. A system according to invention principles addresses these requirements and associated problems.

SUMMARY OF THE INVENTION

A system improves concurrent comparative review of multiple angiographic images and aligns the images in the dimensions of: space, time, and luminance. A system automatically processes different medical image sequences facilitating comparison of the sequences in adjacent respective display areas for use in Angiography or another medical procedure.

An imaging system stores first and second sets of data at different stages of a treatment procedure representing corresponding first and second image sequences individually comprising multiple temporally sequential individual images of vessels of a portion of patient anatomy. The sequential individual images encompass introduction of a contrast agent into patient vessels. An image data processor, identifies first and second mask images of the first and second image sequences respectively as images preceding introduction of contrast agent and determines a translational shift between the first and second mask images. The image data processor transforms data representing individual images of at least one of the first image sequence and the second image sequence in response to the determined translational shift to reduce mis-alignment of the individual images of the first image sequence relative to the individual images of the second image sequence. A display presents first and second image sequences corrected for mis-alignment, in substantially adjacent display areas to facilitate user comparison.

BRIEF DESCRIPTION OF THE DRAWING

FIG. 16 shows reported data provided by an automatic vasculature phase analysis, according to invention principles.

DETAILED DESCRIPTION OF THE INVENTION

A system improves concurrent comparative review of multiple angiographic images of a sequence and aligns the images in the dimensions of space, time, and luminance. The system enables comparative review of registered images and direct comparison of two Angiographic or DSA images of substantially the same portion of anatomy obtained at substantially the same imaging angle and with substantially the same contrast bolus geometry. The system aligns spatial, temporal and luminance content of two individual angiographic image sequences and provides concurrent side by side comparison of multiple different image sequences, for example. The system acquires two angiographic images to be compared using substantially the same: imaging angulation, contrast bolus injection profile, and basic acquisition parameters and improves concurrent review of multiple angiographic images in image sequences by automatically aligning the images in the dimensions of time, space, and luminance.

The system is advantageously usable in diagnosing patients with Splenic Steal Syndrome by comparing DSA images of a hepatic artery with and without splenic artery balloon-occlusion, for example. Patients with Splenic Steal Syndrome exhibit a substantially larger increase in flow through the hepatic artery with the splenic artery occluded than patients without Splenic Steal Syndrome. The system analysis automatically compares the amount of contrast agent present in the hepatic artery between two DSA images. The system acquires images, using substantially the same imaging plane position and angulation, substantially the same position (e.g. head-side, left lateral, for example), substantially the same source to image detector distance, substantially the same imaging plane e.g., the same cranial-caudal angulation and the same lateral (left or right anterior oblique) angulation of the same patient and substantially the same patient anatomy and same patient orientation (i.e. head-first-supine) and substantially the same patient support table position.

Figure 1:
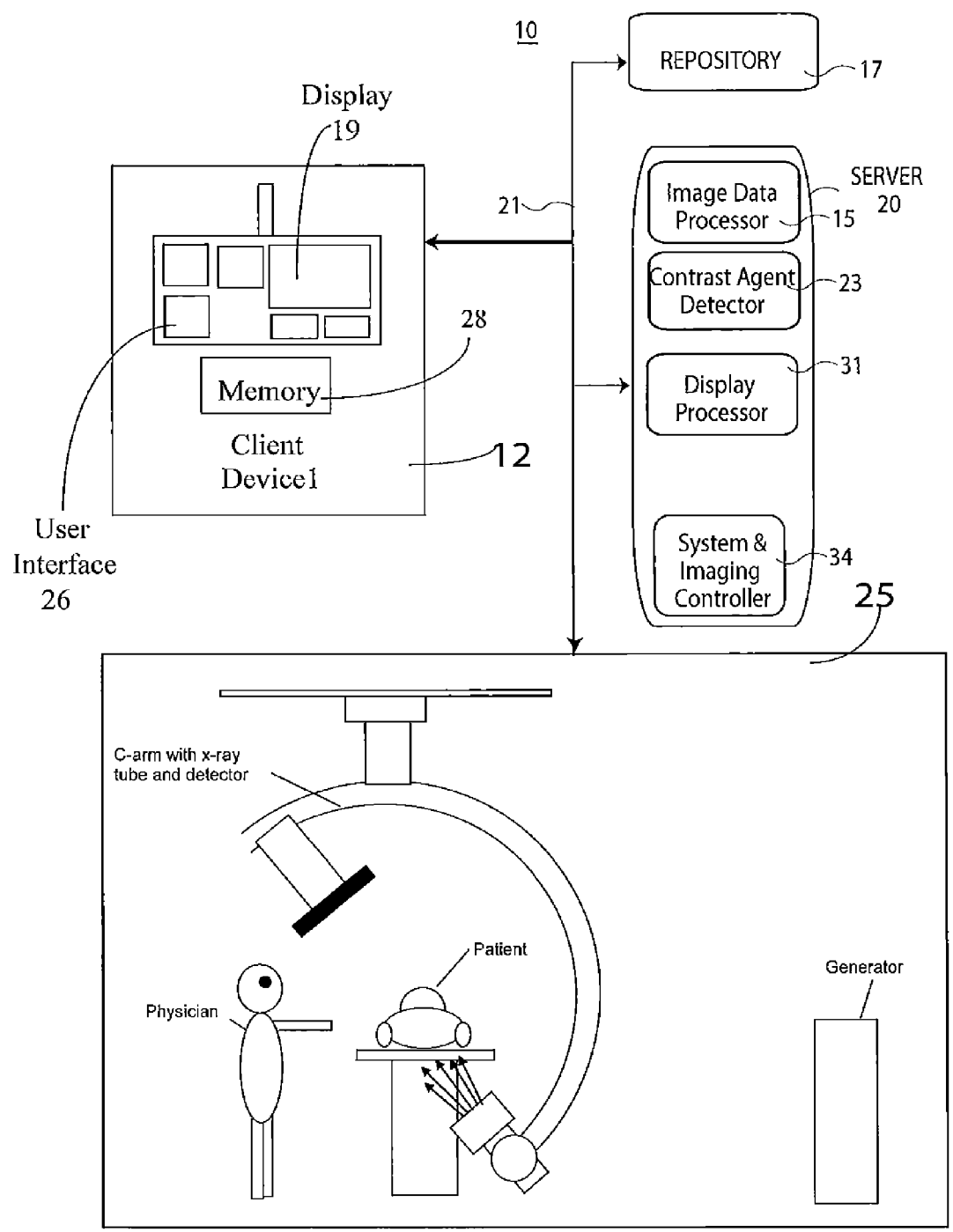
FIG. 1 shows a system for automatically processing different medical image sequences facilitating comparison of the sequences in adjacent respective display areas for use in Angiography or another medical procedure, according to invention principles.

FIG. 1 shows system 10 for automatically processing different medical image sequences facilitating comparison of the sequences in adjacent respective display areas for use in Angiography or another medical procedure. System 10 includes one or more processing devices (e.g., computers, workstations or portable devices such as notebooks, Personal Digital Assistants, phones) 12 that individually include a user interface control device 26 such as a keyboard, mouse, touch-screen, voice data entry and interpretation device, display 19 and memory 28. System 10 also includes at least one repository 17, X-ray imaging modality system 25 (which in an alternative embodiment may comprise an MR (magnetic resonance) or CT scan device, for example) and server 20 intercommunicating via network 21. X-ray modality system 25 provides patient X-ray medical images using a C-arm X-ray radiation source and detector device rotating about a patient table and an associated electrical generator for providing electrical power for the X-ray radiation system. The medical images are generated in response to predetermined user (e.g., physician) specific preferences. At least one repository 17 stores medical image studies for multiple patients in DICOM compatible (or other) data format and associated ancillary data including, an imaging plane position and angle, imaging position, radiation source to image detector distance, patient anatomy imaged, patient position, contrast agent bolus injection profile, X-ray tube voltage, image resolution and radiation dosage.

Figure 2:
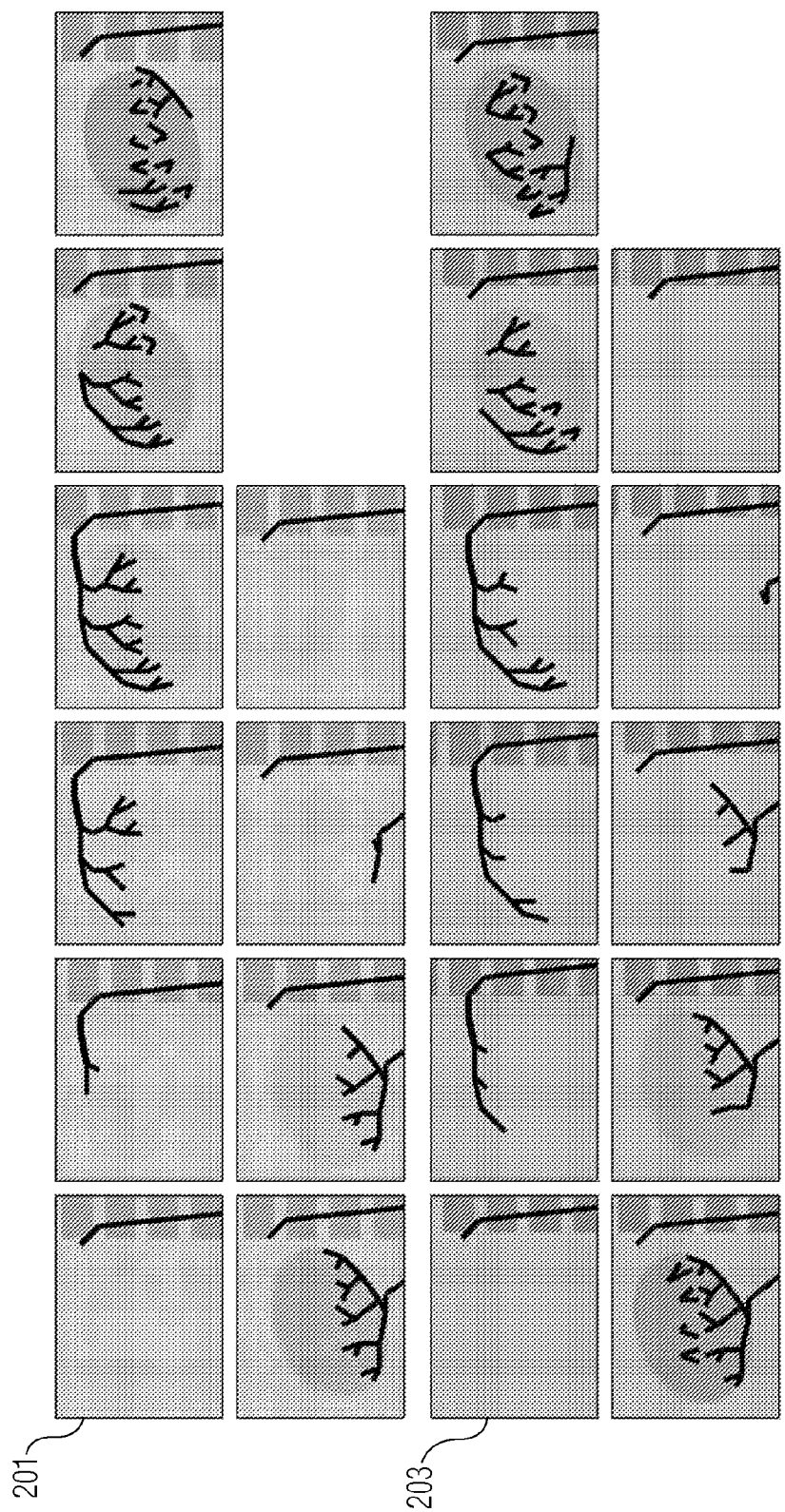
FIG. 2 shows two image sequences individually comprising multiple temporally sequential individual images of vessels of a portion of patient anatomy and encompassing introduction of a contrast agent into patient vessels, according to invention principles.

A medical image study individually includes multiple image series of a patient anatomical portion and an image series in turn includes multiple images. Server 20 includes contrast agent detector 23, image data processor 15, display processor 31 and system and imaging controller 34. Display 19 presents display images comprising a Graphical User Interface (GUI). Imaging controller 34 controls operation of imaging device 25 in response to user commands entered via user interface 26. In alternative arrangements, one or more of the units in server 20 may be located in device 12 or in another device connected to network 21. Imaging system 25 acquires and stores in repository 17 first and second sets of data at different stages of a treatment procedure representing corresponding first and second image sequences individually comprising multiple temporally sequential individual images of vessels of a portion of patient anatomy. The sequential individual images encompass introduction of a contrast agent into patient vessels. FIG. 2 shows two image sequences (sequences 201 and 203) individually comprising multiple temporally sequential individual images of vessels of a portion of patient anatomy and encompassing introduction of a contrast agent into patient vessels.

Image data processor 15 (FIG. 1), identifies first and second mask images of the first and second image sequences respectively as images preceding introduction of contrast agent. Processor 15 determines a translational shift between the first and second mask images and transforms data representing individual images of at least one of the first image sequence and the second image sequence in response to the determined translational shift to reduce mis-alignment of the individual images of the first image sequence relative to the individual images of the second image sequence. Display 19 presents first and second image sequences corrected for mis-alignment, in substantially adjacent display areas to facilitate user comparison.

Figure 3:
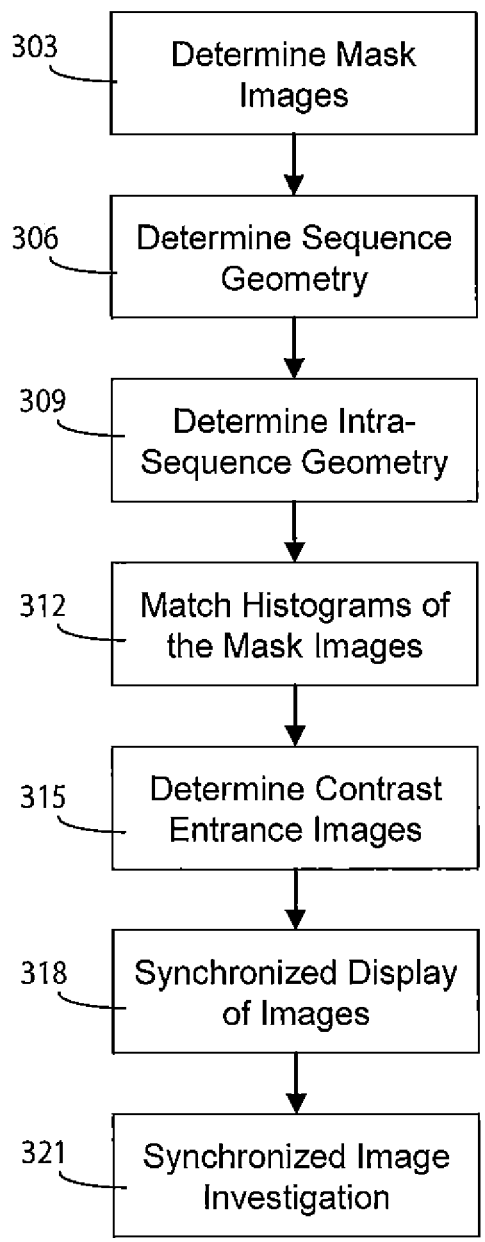
FIG. 3 shows a flowchart of a process used by a system for automatically processing different medical image sequences facilitating comparison of the sequences, according to invention principles.
Figure 4:
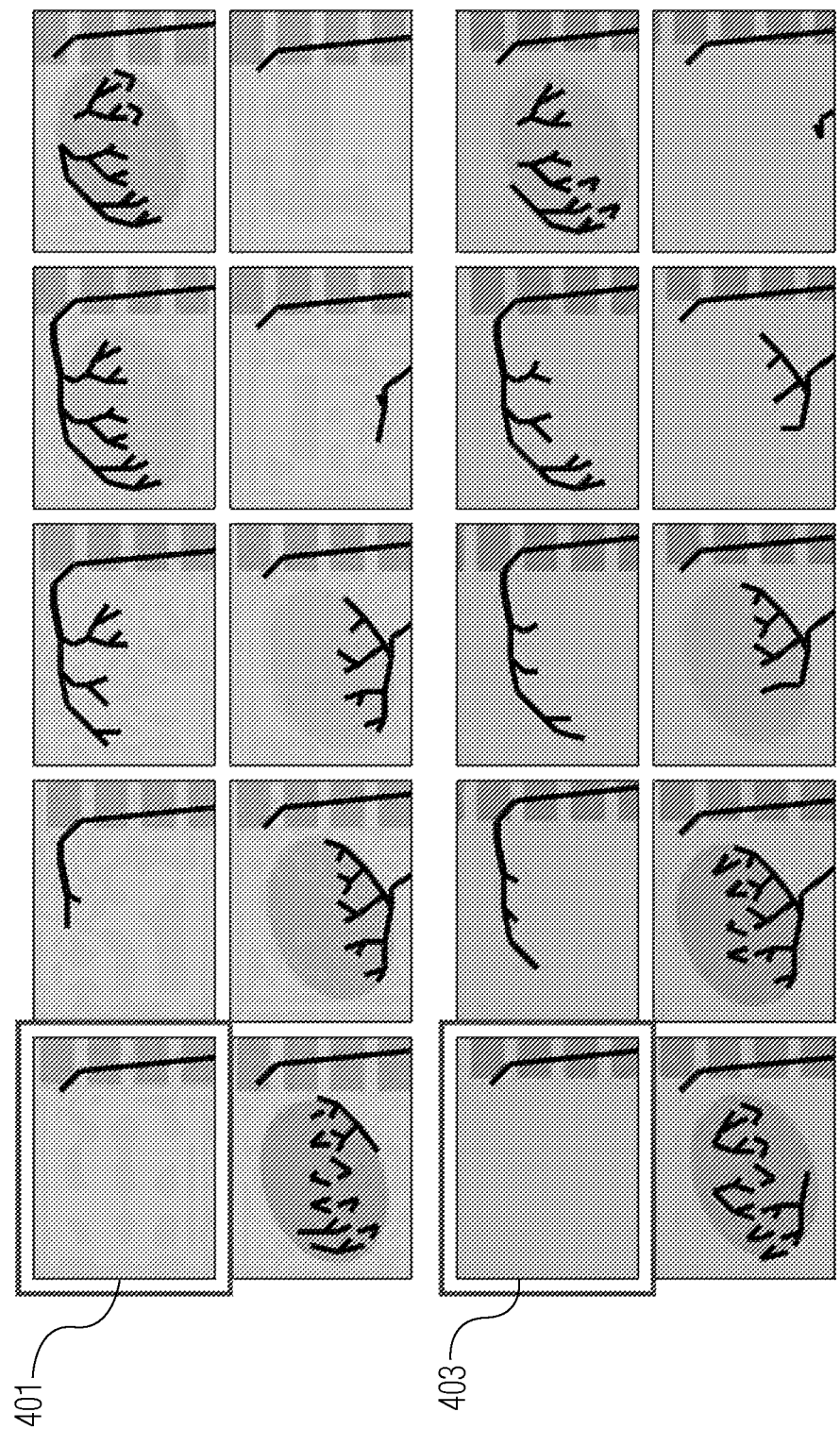
FIG. 4 illustrates automatic selection of first and second mask images in first and second image sequences respectively, according to invention principles.

FIG. 3 shows a flowchart of a process used by system 10 (FIG. 1) for automatically processing different first and second medical image sequences facilitating comparison of the sequences. In step 303, image data processor 15 automatically selects a mask image for the first sequence and a mask image for the second sequence. A mask image is selected as an image occurring in a sequence near the beginning of the sequence and that is exclusive of contrast agent (pre-contrast bolus injection) in the area concerned and occurring following completion of X-ray radiation dose regulation performed by the system. FIG. 4 illustrates automatic selection of first mask image 401 of the first image sequence and selection of second mask image 403 of the second image sequence. In one embodiment, processor 15 selects an image immediately preceding a first image in a sequence exhibiting contrast agent (a contrast entrance image) as a mask image, but other factors may also be considered (e.g. location in respiratory cycle, location in ECG cycle, biological process, or external stimulation). Step 303 is performed if the images are native angiographic images or DSA images, to find the appropriate mask image and to find an image of background area that can be used for spatial and luminance registration.

In step 306 (FIG. 3) image data processor 15 determines a geometric transformation (including translation in the form of a pixel shift, rotation and scaling transformations) between images. Processor 15 automatically identifies a geometric transformation between images using an automated pixel shift determination function comprising iteratively employing rotation, translation and scaling operations to match pixel pair locations between two images.

Figure 5:
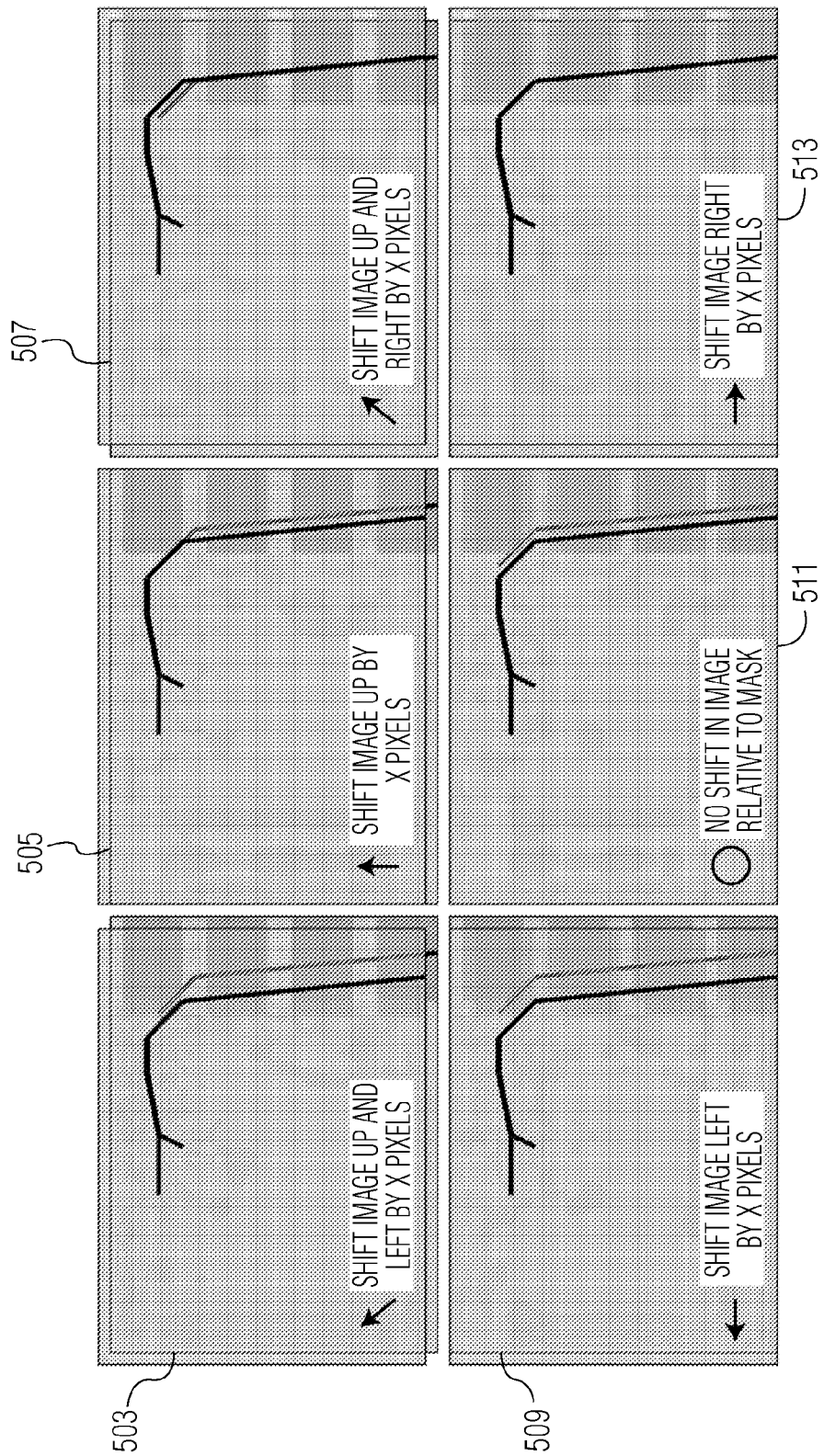
FIGS. 5 and 6 show determination of an optimal translation vector for shifting an image of a sequence relative to a mask image, according to invention principles.
Figure 6:
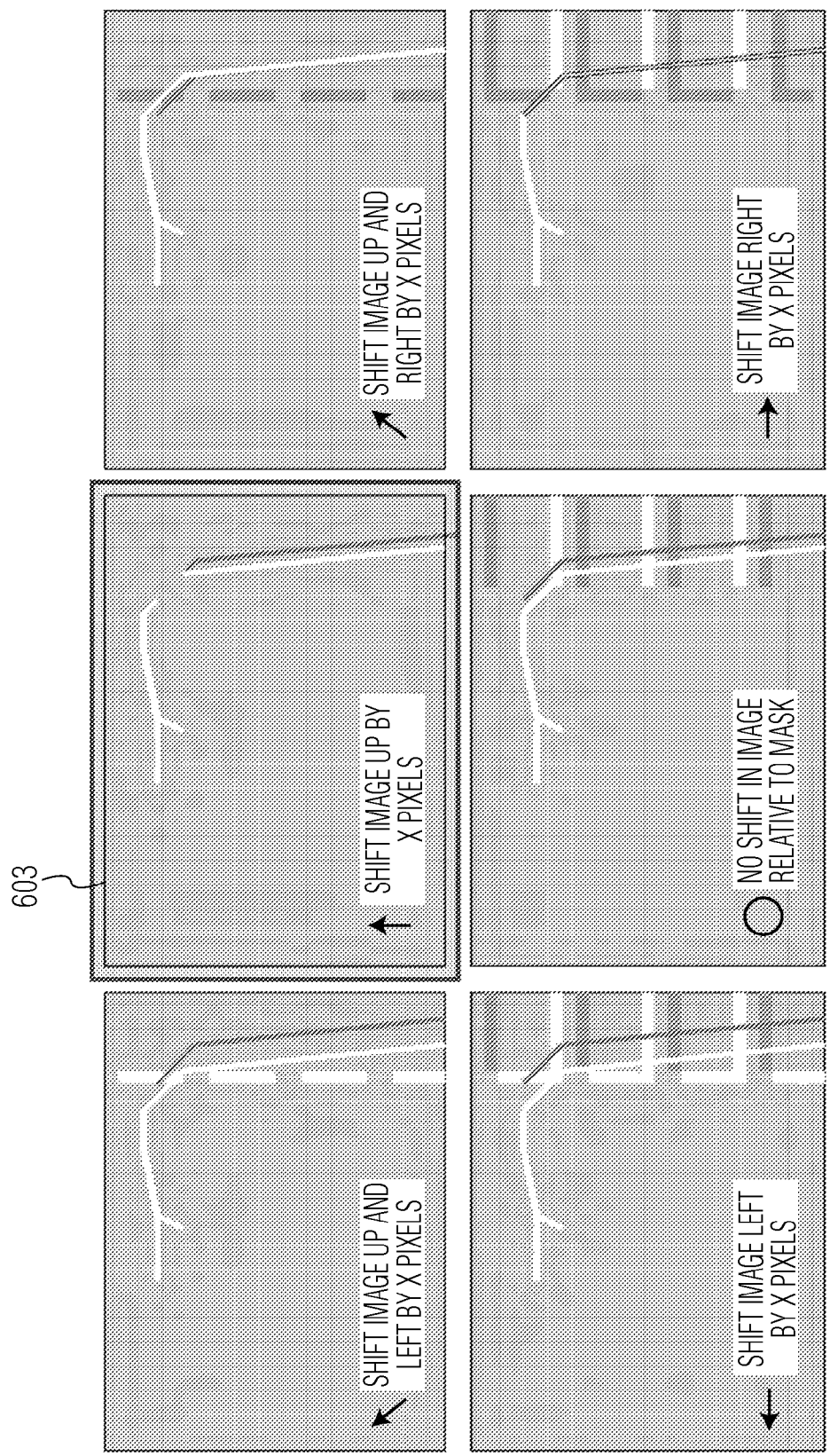
Figure 7:
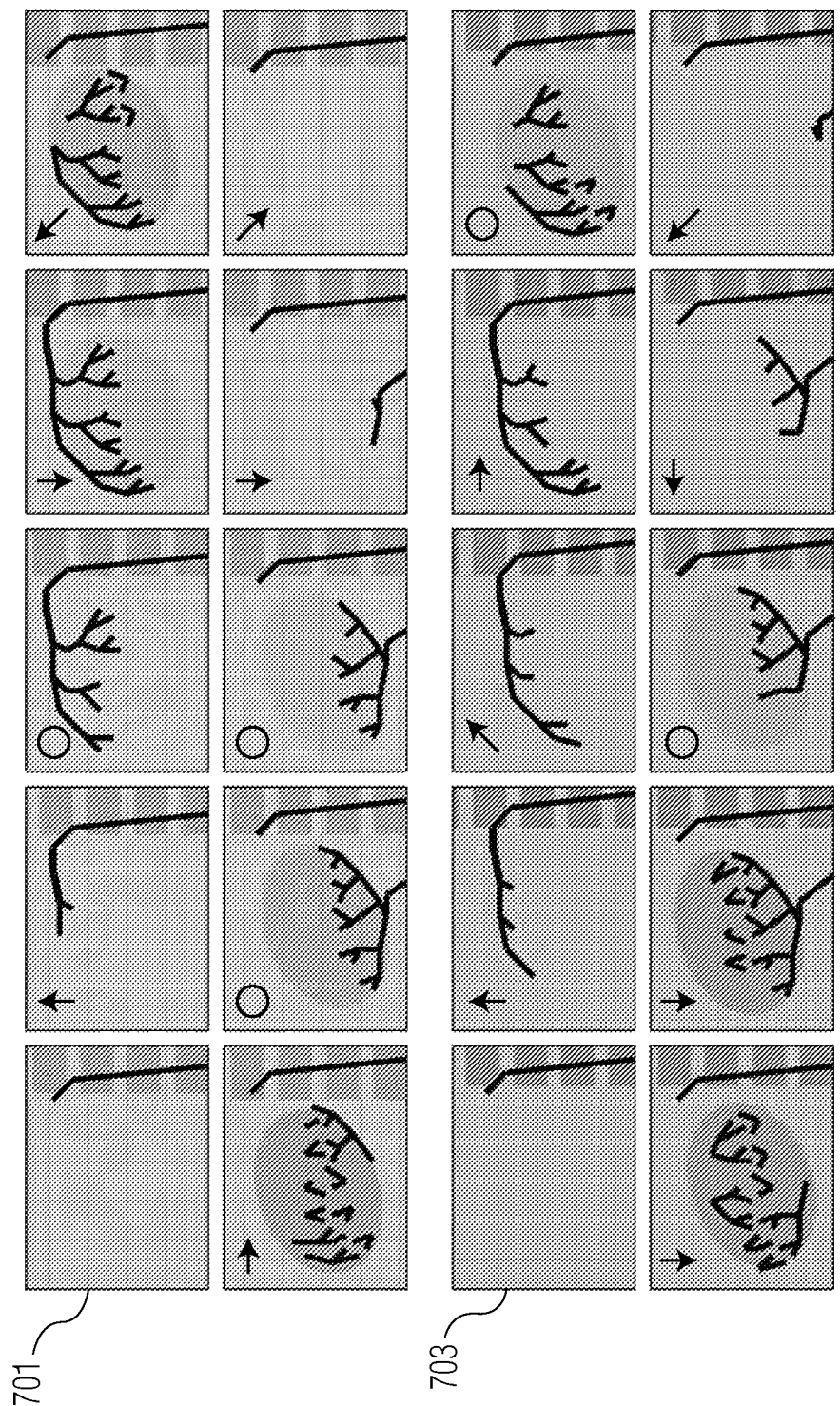
FIG. 7 shows performing translation between each image of two sequences and their respective mask images, according to invention principles.

FIGS. 5 and 6 show determination of an optimal translation vector for shifting an image of a sequence relative to a mask image. Image data processor 15 automatically calculates an optimal pixel shift (x, y coordinate translation) for each individual image of a sequence to align each image of the sequence with its respective sequence mask image. FIG. 5 illustrates iterative determination by processor 15 of different translations shown in images 503, 505, 507, 509, 511 and 513. FIG. 6 shows selection by processor 15 of the translation of image 603 as the optimum translation (pixel shift up by x pixels) that minimizes the error comprising a difference between the shifted image and the mask image in a specific region of interest (ROI). This may be determined by minimizing a mean square root of a summation of the square of the differences in distance (in one dimension) between pixels of a feature in a mask and another image, for example. FIG. 7 shows translation by processor 15 in step 306 of each image of two sequences 701 and 703 relative to their respective mask images using the automatically determined optimum translation for each individual image.

Figure 8:
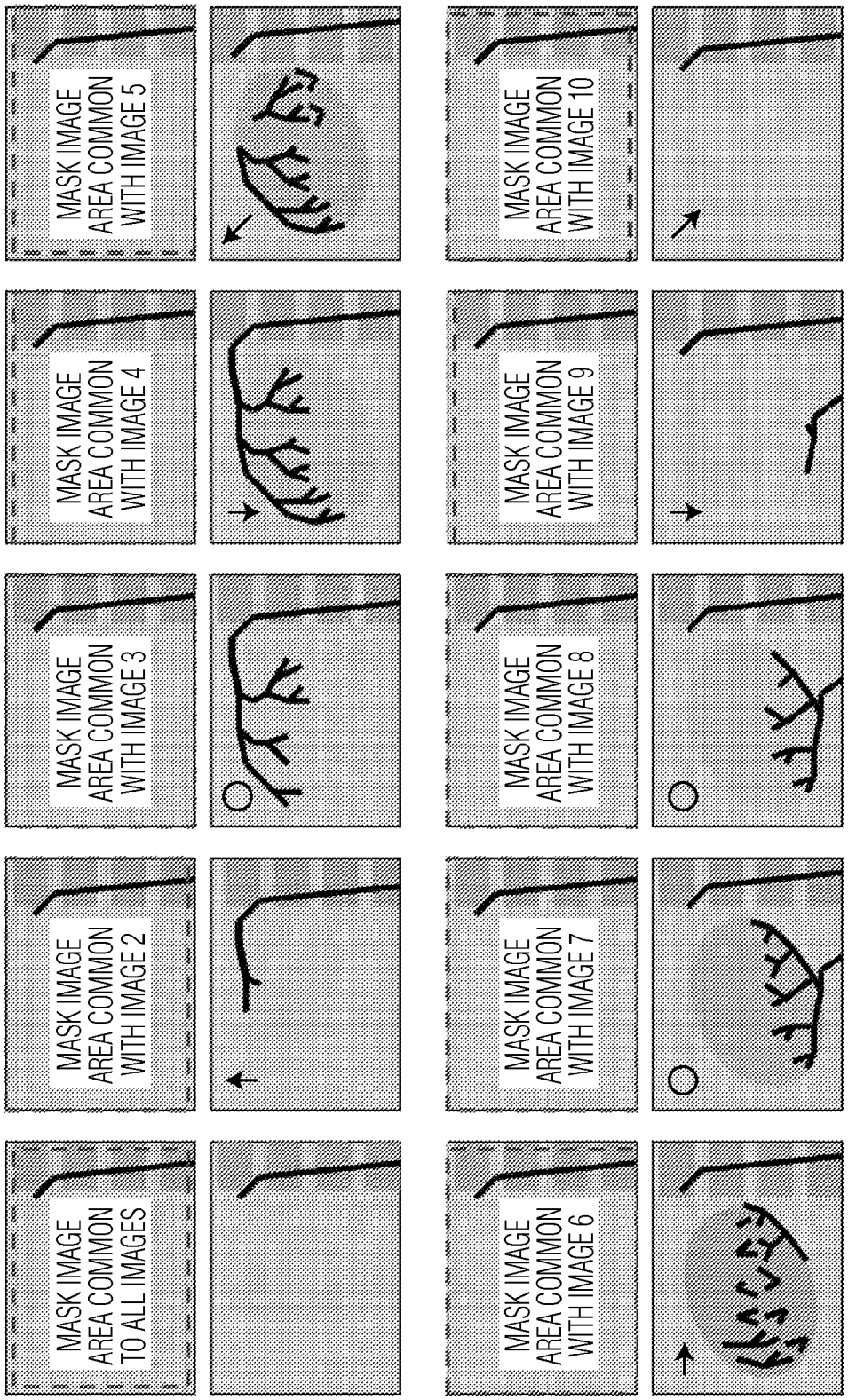
FIG. 8 shows determination of a mask image area common to each individual image of a first image sequence, according to invention principles.
Figure 9:
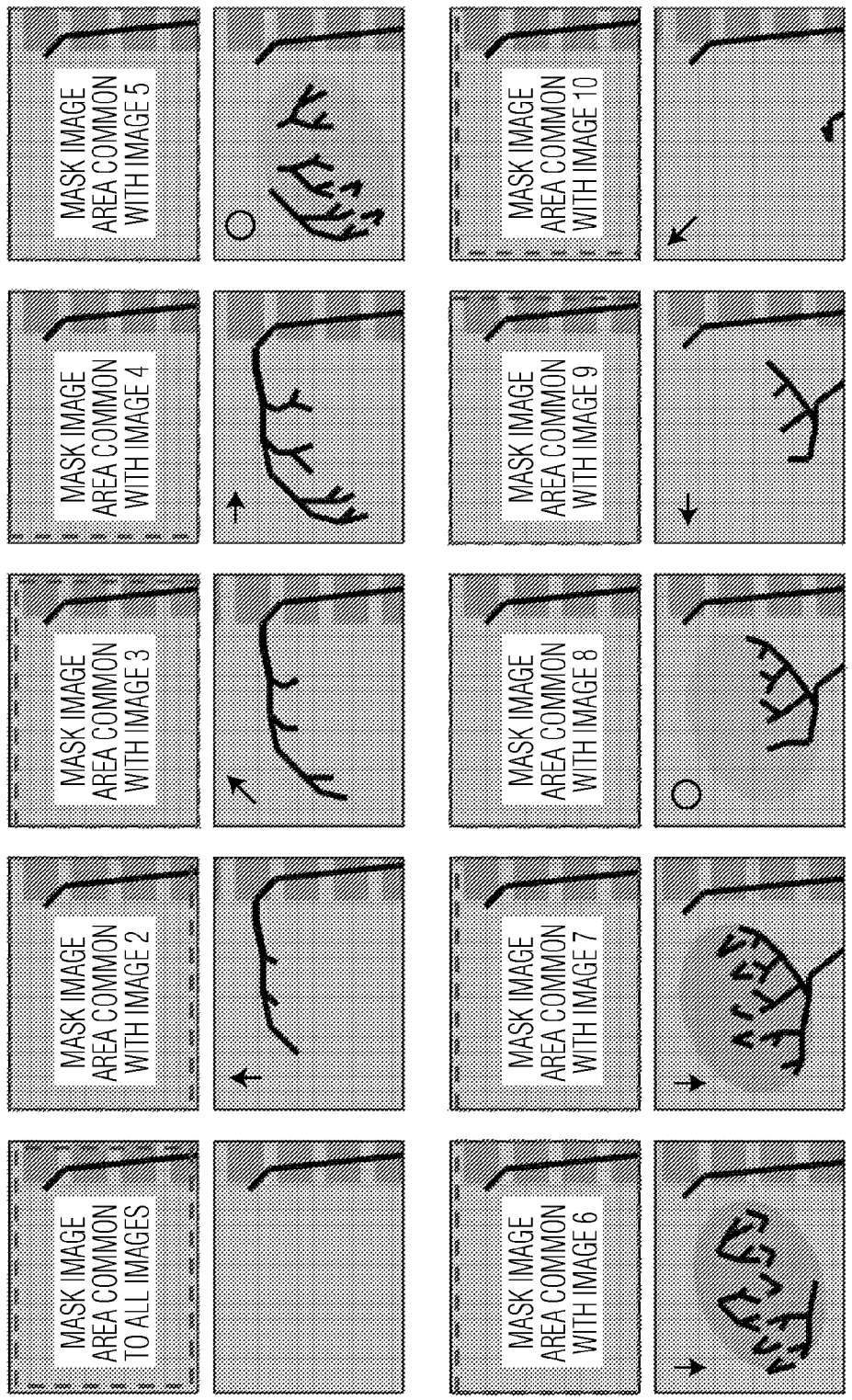
FIG. 9 shows determination of a mask image area common to each individual image of a second image sequence, according to invention principles.

In step 309 (FIG. 3) image data processor 15 automatically determines intra-sequence geometry by identifying an intra-sequence common image area comprising an image area that is shared by all of the images of the first and second image sequences. Processor 15 automatically identifies an area in each image that is common to the images being compared. This area is determined using the geometric transformation and digital zoom values applied to the images. Image processor 15 determines a first common image area comprising an area common between the mask image of the first image sequence and the remaining images of the first image sequence as illustrated in FIG. 8. Image processor 15 determines a second common image area comprising an area common between the mask image of the second image sequence and the remaining images of the second image sequence as illustrated in FIG. 9. Image data processor 15 further automatically identifies an area common between the first common image area, the second common image area and a third common area comprising the common area of an aligned mask image, thus correcting for motion between two image sequence acquisitions. The common area of the aligned mask image is determined by deriving an optimal pixel shift (in the manner previously described) that optimally aligns the identified mask image of the second image sequence to an identified mask image of the first image sequence and by identifying a common area of the aligned mask image.

Figure 10:
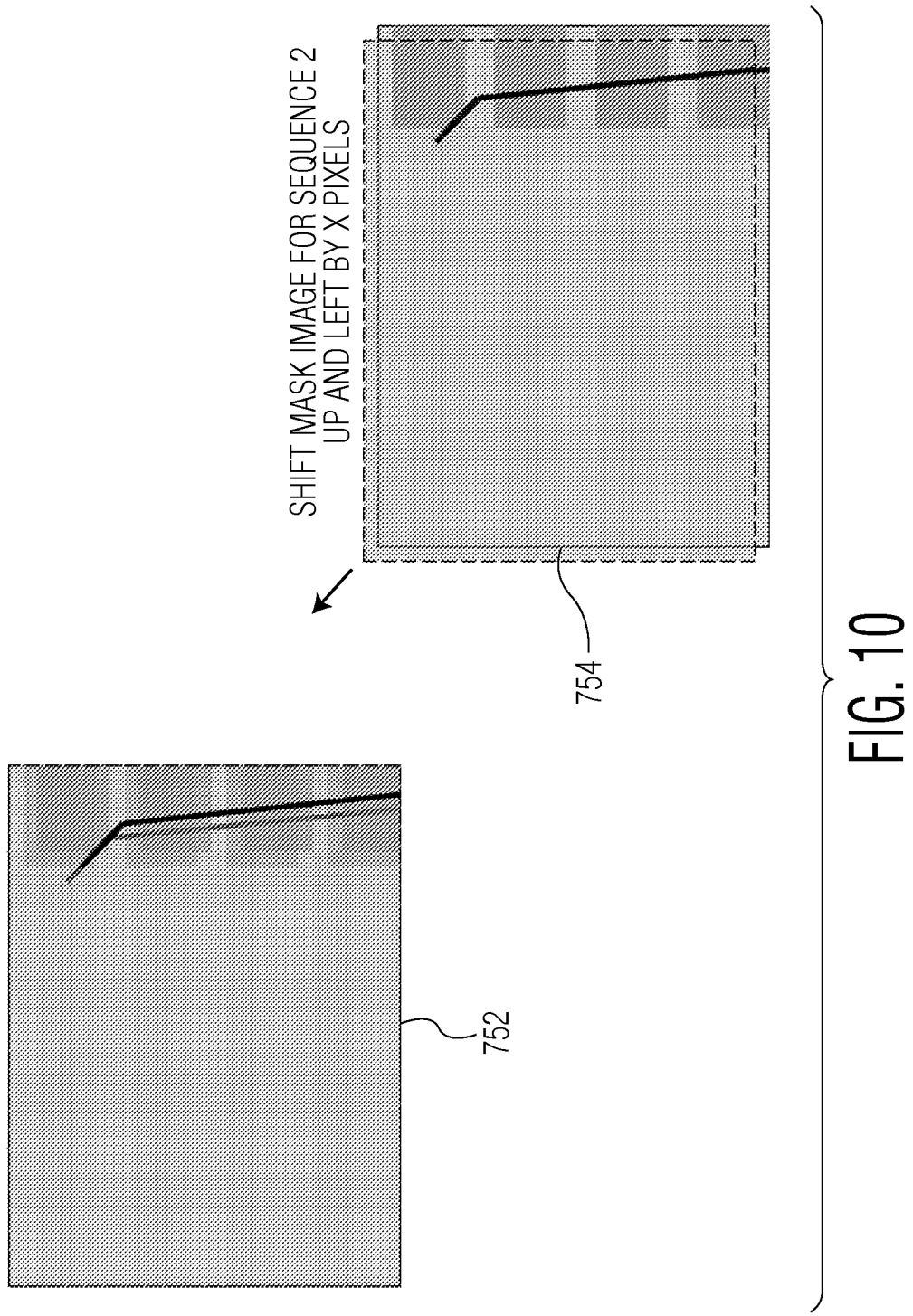
FIG. 10 shows performing an image translation to align a mask image of a first image sequence with a mask image of a second image sequence, according to invention principles.
Figure 11:
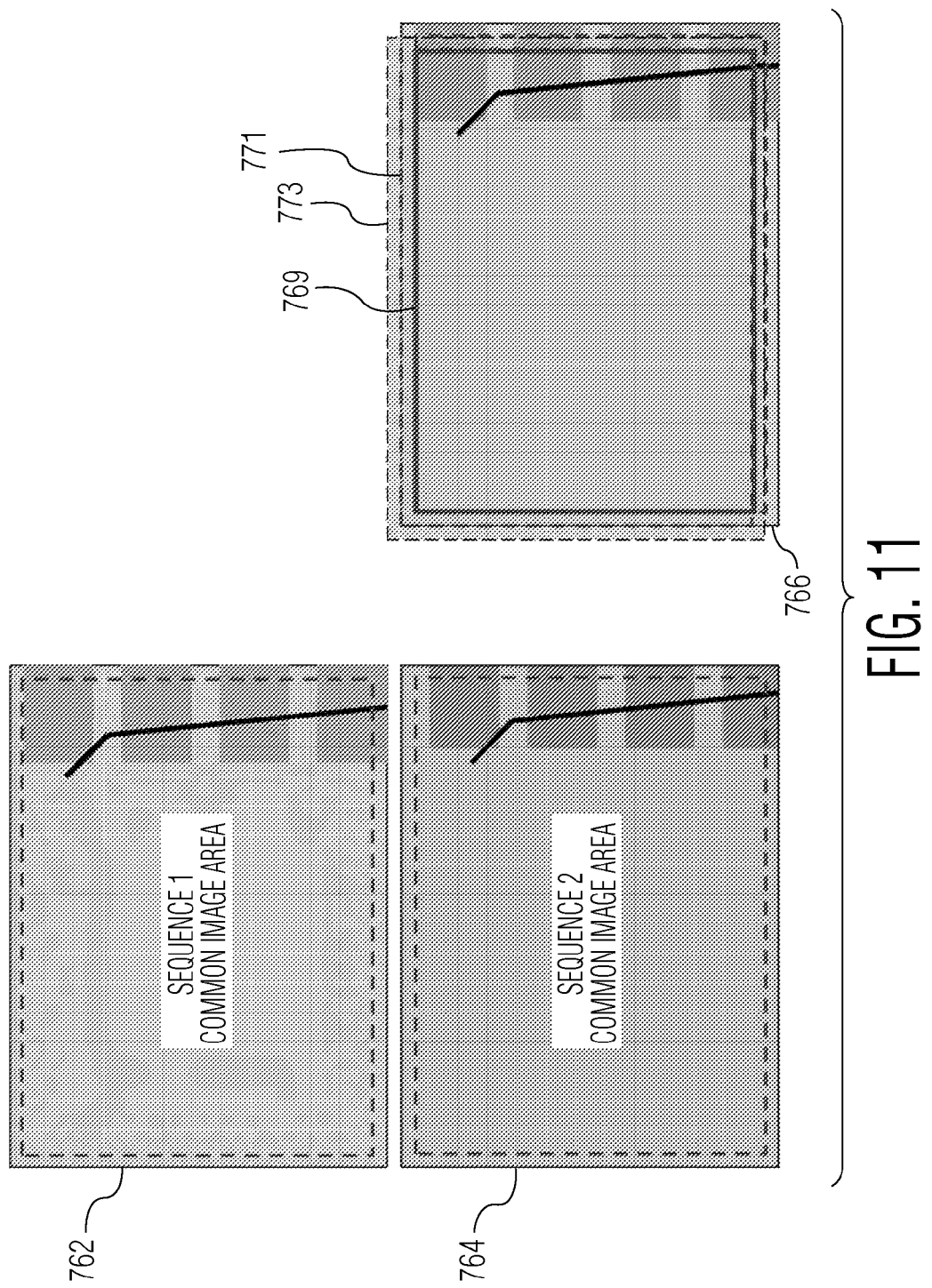
FIG. 11 shows determination of an image area that is common to the images of the first and second image sequences as well as the mask images of the first and second image sequences, according to invention principles.

FIG. 10 shows performing an image translation to align a mask image of the first image sequence with a mask image of the second image sequence. Image 752 shows the mask Image of sequence 2 overlaid onto the mask image of sequence 1, with no pixel shift applied. Image 754 shows the mask image of sequence 2 (dashed line) overlaid onto the mask image of sequence 1 (solid line), with a pixel shift applied to align the content of the two mask images. FIG. 11 shows determination of an image area that is common to the images of the first and second image sequences as well as the mask images of the first and second image sequences. Specifically, image data processor 15 automatically identifies an area common to the first common image area (shown in image 762), the second common image area (shown in image 764), and a third common area comprising the common area of an aligned mask image (shown in image 766) and thereby correcting for motion between two image sequence acquisitions. Image 762 shows the first common image area (of the first sequence) superimposed on the first sequence mask image and image 764 shows the second common image area (of the second sequence) superimposed on the second sequence mask image. Image 766 shows the image area (solid line 769) common to the images of both the first and second image sequences determined by intersecting the first and second common image areas (dashed lines 771 and 773 respectively) on the overlaid (and aligned) mask images.

Figure 12:
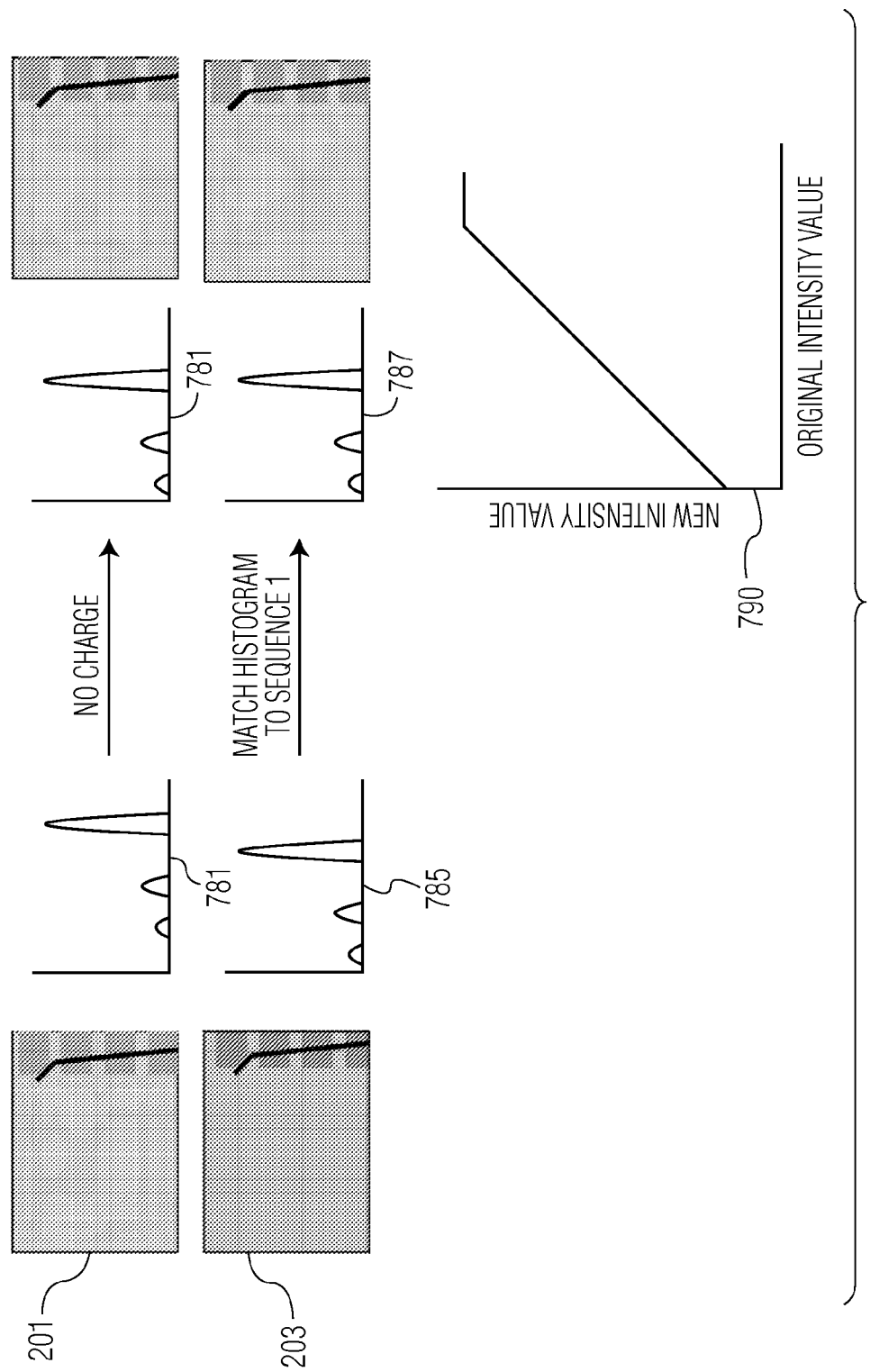
FIG. 12 shows use of a luminance transfer function to perform histogram equalization to match a luminance transfer function of the mask image of a first image sequence with a mask image of a second image sequence, according to invention principles.

In step 312 (FIG. 3) image data processor 15 automatically matches luminance histograms of the identified common image area of mask frames. A histogram of an image is a function that plots the number of pixels (on the y-axis herein) in the image having a specific luminance intensity value (on the x-axis herein) against the range of available luminance intensity values. A histogram over an image approximates a probability density function of the pixel intensity over that image. The resultant curve is useful in evaluating image content and can be used to process the image for improved display (e.g. enhancing contrast). FIG. 12 shows use of a luminance transfer function to perform histogram equalization to match a histogram of the mask image of a first image sequence with a histogram of a mask image of a second image sequence. This histogram matching is used to alter the displayed image luminance intensities so that the images of the different first and second image sequences have similar visual presentation characteristics, and to allow user initiated luminance intensity changes to the images of one sequence to also be automatically applied by processor 15 to the images of the other compared sequences. The histogram matching is performed on the common image area of both sequences identified in step 309 and indicated in image 766 of FIG. 11, to ensure that the luminance values are matched exclusively of the same image content. Histogram matching (Histogram Equalization) is a known method of creating a luminance transfer function for one histogram to match another histogram. In another embodiment, a function other than Histogram Equalization may be used that approximates the effect of Histogram Equalization to match one image to another.

Processor 15 automatically provides histogram 781 of the mask image of first image sequence 201 and histogram 785 of the mask image of second image sequence 203. Processor 15 automatically determines a luminance transfer function 790 that matches histogram 785 of the mask image of second image sequence 203 to histogram 781 of the mask image of first image sequence 201. Processor 15 automatically applies transfer function 790 to the data representing the common image area of the mask image of the second image sequence to provide mask image data having transformed histogram 787. In one mode, system 10 provides a histogram matched display (enabled by default) using a histogram matching function to modify depicted luminance values of the second image sequence to provide an image sequence with an overall luminance presentation that matches that of the first image sequence. Adjustments to the displayed luminance values (e.g. brightness/contrast or window level adjustments) made to one image are applied to both images, using the histogram matching transformation. Multiple image post-processing actions applied to one image sequence are likewise applied to the other image sequence (e.g., in providing opacified combination of multiple image frames or flow enhanced composite DSA, for example). DSA images may also be displayed with pixel shift vectors applied to the individual subtracted frames of the image, but maintaining compatible image sequence displays (i.e., shifting the contrast frame to match the mask). If multiple pixel shifts are applied to different image areas or to a single image area, an additional geometric transformation is performed for each reference frame associated with individual shifts of the corresponding multiple pixel shifts and these additional geometric transformations are applied to enable accurate spatial registration in multiple pixel shifted DSA images.

Figure 13:
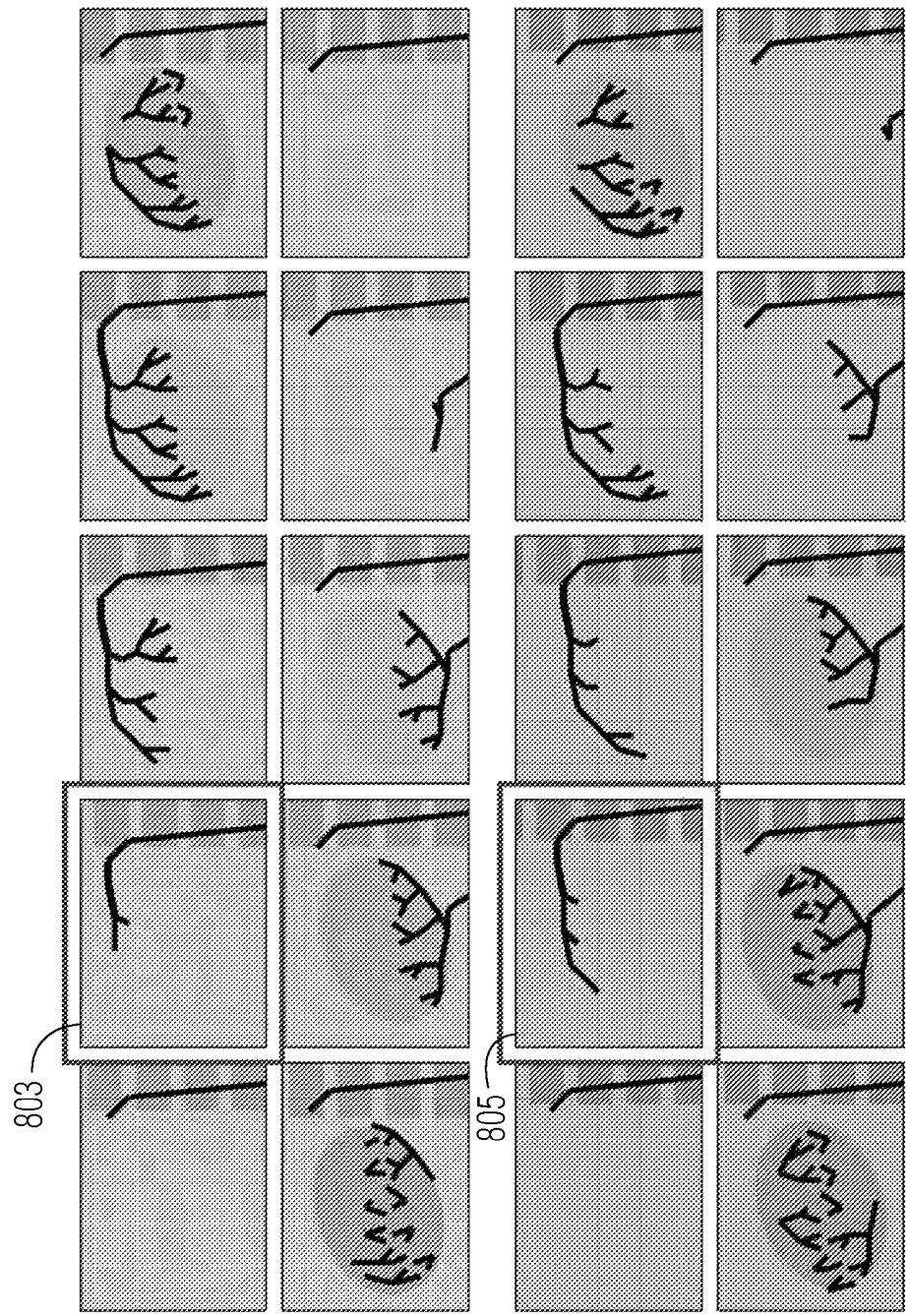
FIG. 13 shows automatic contrast entrance image selection for selecting a contrast entrance image for a first image sequence and selecting a mask image for a second image sequence, according to invention principles.

FIG. 13 shows automatic mask image selection for selecting contrast entrance image 803 for a first image sequence and selecting contrast entrance image 805 for a second image sequence. In step 315 (FIG. 3) image data processor 15 automatically determines contrast agent entrance images 803, 805 for the first and second image sequences. Different known methods may be used to automatically identify a contrast entrance image of an image sequence. In one embodiment, processor 15, identifies an image of an image sequence as comprising an image following initiation of introduction of contrast agent into a patient vessel that first shows contrast agent in response to a determined change in pixel luminance content of the image (or a ROI) relative to a mask image or image acquired prior to introduction of contrast agent into a patient. Processor 15 automatically selects the contrast entrance image from each sequence, which occurs following the mask image and contains the first appearance of contrast agent in the sequence. The change in pixel luminance content may be determined in response to a detected change in a histogram of the image that plots pixel luminance intensity values against frequency, or from a change in a determined pixel value statistic or metric derived from processing the pixel luminance values e.g. in response to some cumulative, or average or other luminance measure derived from the pixel values of the image.

In step 318 (FIG. 3) image data processor 15 automatically provides synchronized display of images of the first and second sequences on display 19 (FIG. 1). Image data processor 15 automatically adjusts the displayed luminance values according to the determined histogram matching function and synchronizes automated sequential display of the images of each sequence to start at a contrast entrance image. Image data processor 15 automatically displays individual images of each sequence according to the respective individual image acquisition time (relative to the acquisition time of the contrast entrance image). Display 19 presents first and second synchronized image sequences corrected for mis-alignment, in substantially adjacent display areas to facilitate user comparison In one mode (enabled by default) system 10 displays two image sequences in a synchronized fashion. In a play mode, two images are updated to maintain temporal registration relative to the start of contrast agent injection as identified by the contrast agent entrance image of each image sequence for the two angiographic image sequences. The images are displayed at a time relative to the start of the contrast agent injection as determined by a time stamp value indicating time relative to the contrast agent entrance image. Images acquired at different frame rates are displayed at different rates but by maintaining the same displayed time point relative to the start of the contrast agent injection. The common image area is highlighted or exclusively displayed in this mode. In another embodiment, system 10 displays two image sequences in a synchronized manner at the same rate in response to user command.

Figure 14:
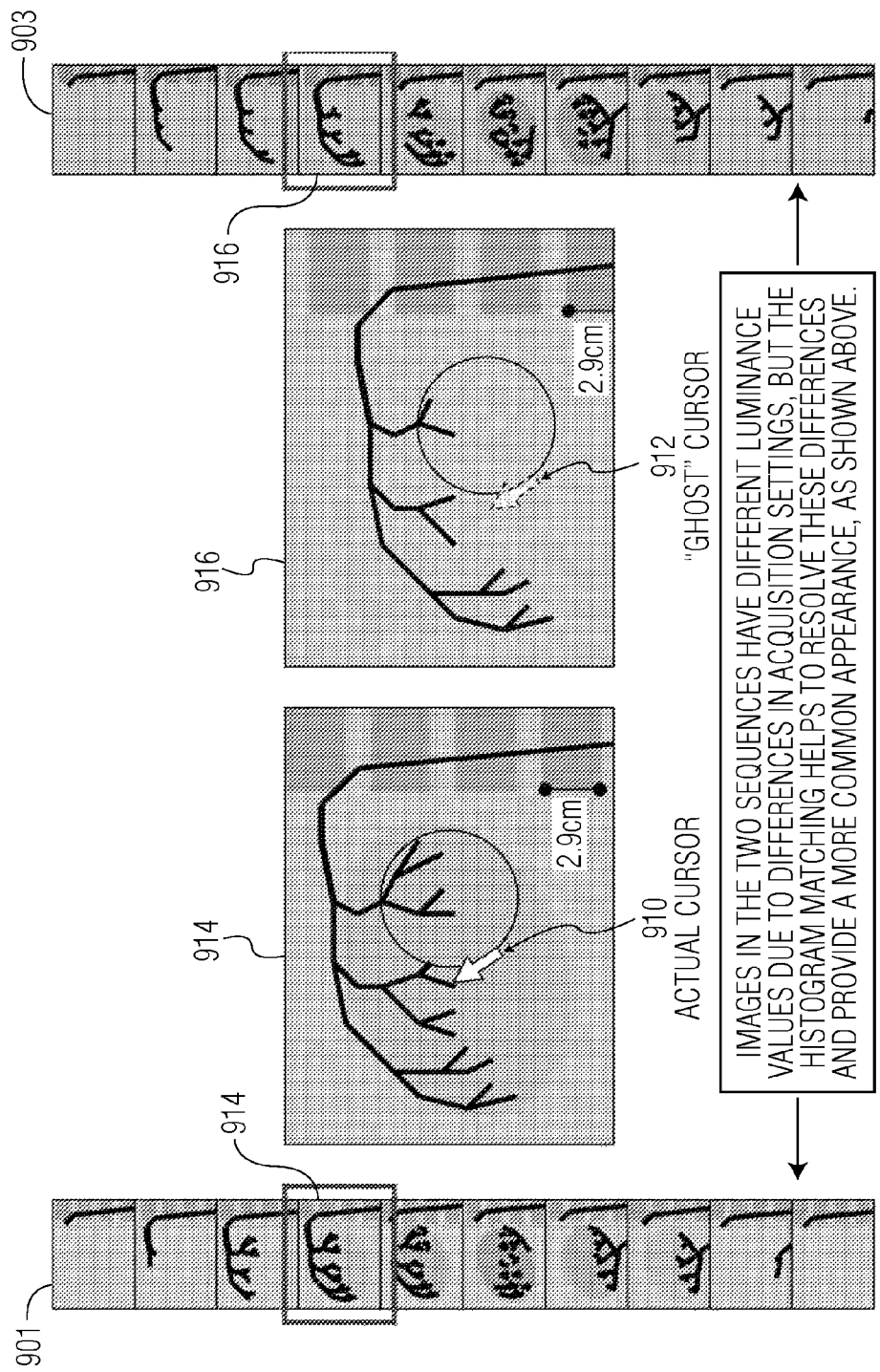
FIG. 14 shows display of a cursor in a corrected position, according to invention principles.

In step 321 (FIG. 3), image data processor 15 automatically enables synchronized investigation of images. FIG. 14 shows display of a cursor in a corrected position. In one mode, two images 914 and 916 of the two sequences 901 and 903 are examined in a synchronized fashion. This mode may be automatically included in a synchronized display mode or in a separate sub-mode of a synchronized display mode. In this mode, image data processor 15 provides a ghost or duplicate cursor 912 in image 916 at the same location as cursor 910 in image 914 (determined using a geometric transformation). Measurements and annotations made in this mode enabled are performed by processor 15 on both images concurrently, maintaining proper positioning of measurement points, cursors, annotations and labels, for example, in the images (using a geometric transformation). Results of an analysis of image content for both image sequences, is presented independently or in a combined results display area.

Movement of cursor 910 in image 914 is depicted in matching image 916 (based on acquisition times relative to mask images) in the other sequence. Measurements and annotations drawn in image 914 are automatically added by processor 15 to matching image 916 in the other sequence. Processor 15 applies the same image analysis function to all compared sequences (e.g. Opacification or Flow analysis functions). The sequence and intra-sequence geometry information is used to update cursor and/or graphics to be displayed at the same position within corresponding images of two sequences (i.e. aligned with image content). Cursor and graphic representations are depicted in the compared sequences in their correct positions in relation to the image content, which does not necessarily correspond to image pixel position. Images in the two sequences have different luminance values due to differences in acquisition settings, but processor 15 applies histogram matching to resolve these differences and provide a more consistent appearance, as shown above.

Different images may be used instead of angiographic images, but the basic modality (e.g. CT, MR, X-ray, for example) of the images being compared is the same, as is the format of the acquisitions (e.g. angiography versus fluoroscopy for X-ray, T1 versus T2 for MRI, for example). System 10 also operates with more than two image sequences and additional images are registered in space and luminance to a first image. In one embodiment the system uses a linear affine geometric transformation but in another embodiment a non-linear geometric transformation may be applied to determine a geometric transformation to align spatial coordinates of the images (e.g. a flexible pixel shift). The system is usable in fields involving concurrent display of multiple image sequences of the same object or content, where review and comparison of these images is of value. The system automatically aligns two images for comparative review by aligning space, time and luminance attributes. The system is automatically used in response to a user initiating a mode or command to concurrently review two image sequences of substantially the same patient anatomy that are also acquired with the substantially same imaging attributes.

Figure 15:
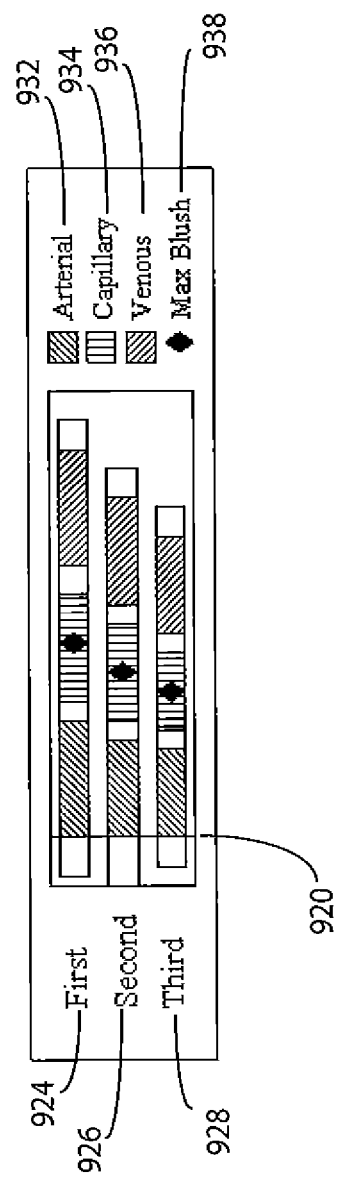
FIG. 15 shows a diagram indicating relative amount of time contrast agent spends in arterial, capillary and venous phases, according to invention principles.

FIG. 15 shows a diagram indicating relative amount of time contrast agent spends in arterial 932, capillary 934 and venous phases 936 for three image sequences 924, 926 and 928 having an aligned contrast agent entrance image 920. The diagram also identifies the maximum blush image 938. In other embodiments, the different phases and features are distinguished using different visual attributes including, color, highlighting, shape, symbols, shading or text, for example. Image data processor 15 (FIG. 1) performs an automatic comparison of images registered at least one of in time, spatially and in luminance and displays the results of these comparisons. When comparing images, a first image is automatically set (or user selected) to be an earliest acquired image based on acquisition time and date. Image data processor 15 automatically performs a vessel phase analysis for each image being compared using a method described in U.S. patent application Ser. No. 13/026,417 filed 14 Feb. 2011. The phase analysis identifies, arterial phase (start and end images), capillary phase (start and end images), a maximum capillary blush image, venous phase (start and end images) and a washout image (first image after venous phase that contains no contrast agent). Images not identified specifically to one of these phases may be images that do not contain contrast (e.g. images prior to contrast agent image 920) or images that contain a mixture of vascular phases.

FIG. 16 shows reported data 944 provided by an automatic vasculature phase analysis performed by processor 15. The reported data includes data indicating time to maximum capillary blush and time to washout for each image sequence and durations of each vessel phase. For example, if acquisition of a second image of a sequence ended before washout was reached, a Time to Washout value is not reported for the second image and instead a value of "n/a" is reported. For spatially registered images, a comparison of substantial content change of a region is automatically performed. Substantial content change in one embodiment comprises an area (e.g. the smallest circular or rectangular area) that contains pixels whose luminance intensity values vary by at least a predetermined percentage (e.g. 20%) of their maximum luminance intensity value throughout the individual images of the image sequence. A region of substantial content change is graphically depicted on each image to show the relative locations in the image where substantial content change occurs. A numerical display of the area (in pixels$^2$) is also provided to indicate the relative change in the area of each image that contains substantial content change. Processor 15 also performs an automatic comparison of luminance values using the histogram matched luminance registered images.

Figure 17:
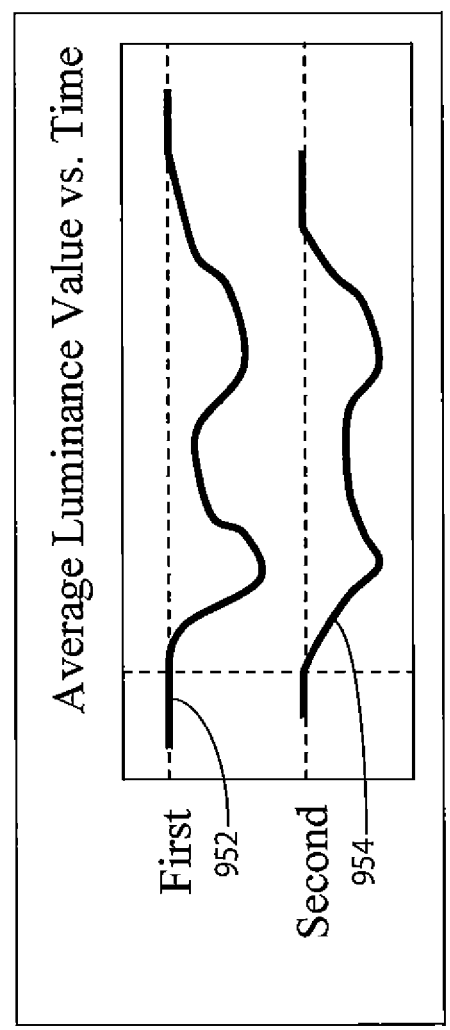
FIG. 17 shows a plot of average luminance intensity value against time (for a common image area) of each image of each image sequence where the images are synchronized in response to an identified contrast entrance image of each image sequence and indicating differences between the luminance values of the images, according to invention principles.
Figure 18:
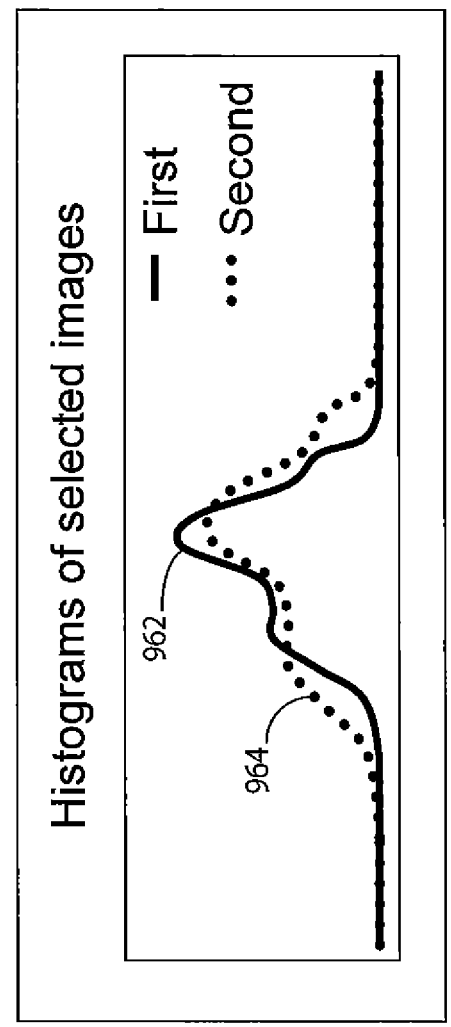
FIG. 18 shows histograms of the common image area of the displayed images for each image sequence, according to invention principles.

FIG. 17 shows a plot of average luminance intensity value against time (for a common image area) of each image of each image sequence where the images are synchronized in response to an identified contrast entrance image of each image sequence and indicating differences between the luminance values of the images. The plot shows the differences between image sequences 952 and 954. FIG. 18 shows histograms 962 and 964 of the common image area of the displayed images of first and second image sequences. In addition to (or in place of) displaying the histograms of individual images of the image sequences being compared, the averaged histograms of each image sequence may be displayed. Image data processor 15 automatically calculates and displays numerical values for each image including, average luminance intensity value for the contrast enhanced images of the image, maximum variation in Average Luminance Intensity and maximum absolute difference between the average luminance value of each image and the average luminance value of the mask image or pre-contrast entrance images.

A user is provided with the capability to specify image and image sequence comparisons be performed on a specific region of interest (ROI) inside an identified common image area. A user selects this function and specifies a ROI in one of the images and the analysis is computed for whole images for a user specified ROI (the ROI is automatically copied to the other images using the spatial registration information). The ROI can be of multiple different shapes and or sizes, selected by the user and may identify a single pixel in the common image for comparison. Processor 15 automates quantitative comparative analysis of specific attributes of multiple X-ray images and operates automatically in response to a user invoked comparative review of multiple X-ray images of the same patient and patient anatomy.

Figure 19:
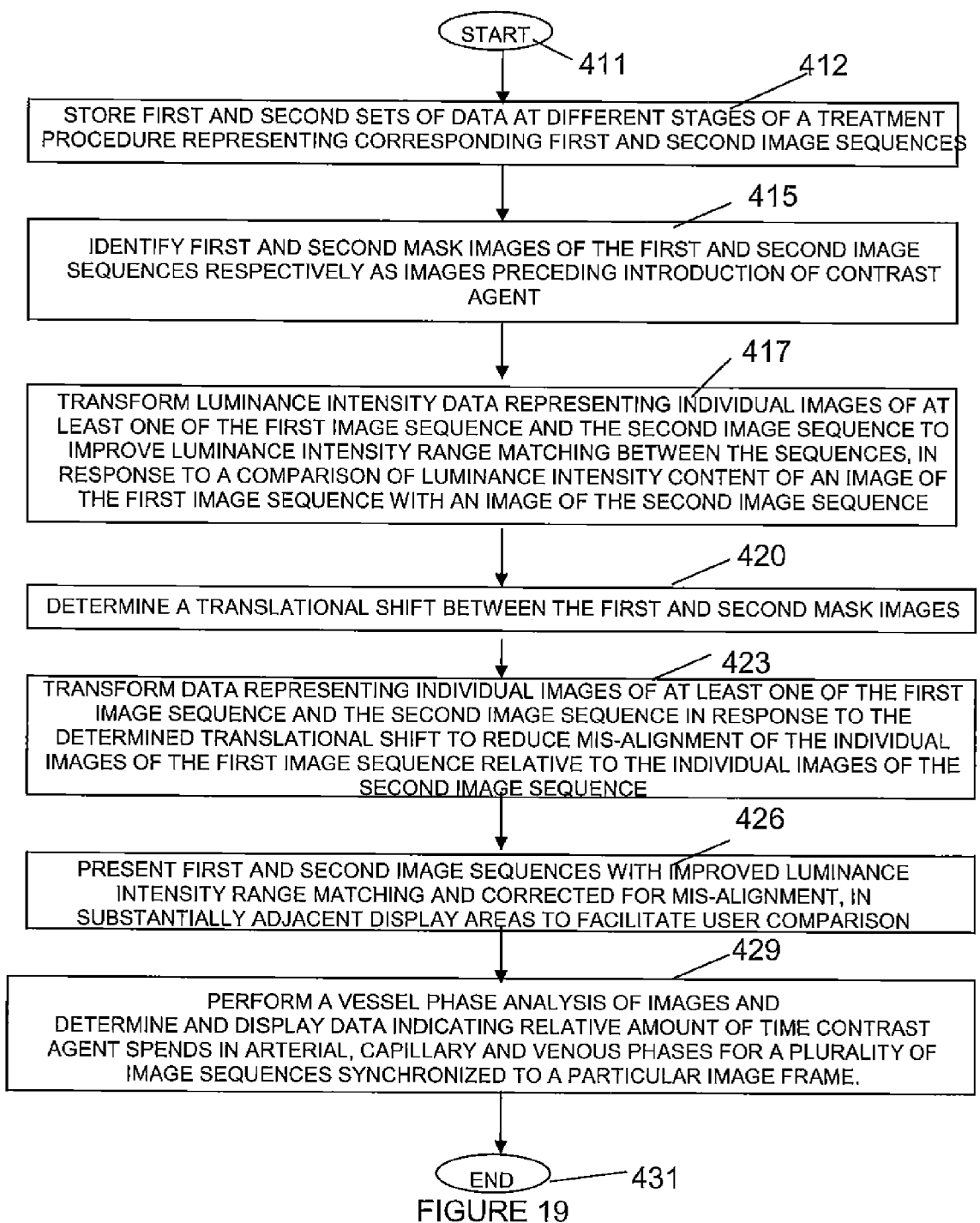
FIG. 19 shows a flowchart of a process used by a system for automatically processing different medical image sequences facilitating comparison of the sequences in adjacent respective display areas, according to invention principles.

FIG. 19 shows a flowchart of a process used by system 10 (FIG. 1) for automatically processing different medical image sequences facilitating comparison of the sequences in adjacent respective display areas. In step 412 following the start at step 411, image data processor 15 stores first and second sets of data at different stages of a treatment procedure representing corresponding first and second image sequences individually comprising multiple temporally sequential individual images of vessels of a portion of patient anatomy. Imaging system 10 stores the first image sequence together with data identifying settings used by an image acquisition device in acquiring the first image sequence and the settings are used in acquiring the second image sequence. The settings comprise data indicating at least one of, (a) an imaging plane position and angle, (b) imaging position, (c) radiation source to image detector distance, (d) patient anatomy imaged, (e) patient position, (f) contrast agent bolus injection profile, (g) X-ray tube voltage, (h) image resolution and (i) radiation dosage. The sequential individual images encompass introduction of a contrast agent into patient vessels and the first image sequence and the second image sequence comprise DSA (digital subtraction angiography) images. Further, the first image sequence is obtained on a first occasion using a first administration of a contrast agent prior to an interventional procedure and the second image sequence is obtained on a second occasion using a second administration of a contrast agent following the interventional procedure.

In step 415, processor 15 identifies first and second mask images of the first and second image sequences respectively as images preceding introduction of contrast agent. Processor 15 in step 417 transforms luminance intensity data representing individual images of at least one of the first image sequence and the second image sequence to improve luminance intensity range matching between the sequences, in response to a comparison of luminance intensity content of an image of the first image sequence with an image of the second image sequence and user initiated change of luminance intensity of an image of the first image sequence. Image data processor 15 transforms the luminance intensity data using a luminance transfer function derived from histograms of the image of the first image sequence and the image of the second image sequence. The histograms indicate numbers of pixels in an image having particular luminance intensity values or value ranges. The image of the first image sequence and the image of the second image sequence comprise the first and second mask images respectively, in one embodiment.

Image data processor 15 identifies an image area common to the individual images of the first and second image sequences and applies the determined translational shift sequences and the determined luminance transfer function to image pixel data of the common image area. Processor 15 excludes application of the determined translational shift and the determined luminance transfer function to image areas external to the common image area. Processor 15 provides data comprising histograms of the common image area of the displayed images for the first and second image sequences. In one embodiment, processor 15 determines multiple first translational shifts between the first mask image and corresponding multiple images of the first image sequence and determines multiple second translational shifts between the second mask image and corresponding multiple images of the second image sequence. Processor 15 transforms data representing individual images of the first image sequence in response to the determined multiple first translational shifts and transforms data representing individual images of the second image sequence in response to the determined multiple second translational shifts. In another embodiment, image data processor 15, identifies an image area common to the individual images of the first image sequence, transforms data representing the identified common area of the individual images of the first image sequence in response to the determined multiple first translational shifts. Processor 15 identifies an image area common to the individual images of the second image sequence and transforms data representing the identified common area of the individual images of the second image sequence in response to the determined multiple second translational shifts.

In step 420, processor 15 determines a translational shift between the first and second mask images. In step 423, processor 15 transforms data representing individual images of at least one of the first image sequence and the second image sequence in response to the determined translational shift to reduce mis-alignment of the individual images of the first image sequence relative to the individual images of the second image sequence. In step 426 display processor 31 presents first and second image sequences with improved luminance intensity range matching and corrected for mis-alignment, in substantially adjacent display areas on display 19 to facilitate user comparison. The substantially adjacent display areas enable a user to synchronously increment and compare before and after procedure medical images. Display processor automatically synchronizes presentation of the first image sequence and the second image sequence in response to at least one of, (a) a heart cycle signal and (b) a respiratory motion indicative signal. Display processor 31 automatically synchronizes presentation of the first image sequence and the second image sequence in respective substantially adjacent display areas based on an image frame synchronized with a heart cycle signal and closest to time of introduction of contrast agent and in response to identification of the first image frame and relative to introduction of contrast agent. Processor 15 enables a user to synchronously increment through image frames of both the first image sequence and the second image sequence, one image frame at a time.

Image data processor 15 in step 429 performs a vessel phase analysis of images and determines and displays data indicating relative amount of time contrast agent spends in arterial, capillary and venous phases for a plurality of image sequences synchronized to a particular image frame. Image data processor 15 automatically repositions a cursor to a corresponding position in a corresponding image of the second image sequence. Further, in response to a user addition of ancillary information to a particular feature in an image of the first image sequence, image data processor 15 automatically adds corresponding ancillary information to a corresponding particular feature in a corresponding image of the second image sequence. The ancillary information comprises at least one of, (a) an annotation and (b) an image related measurement. Processor 15 provides data indicating at least one of, (a) time to maximum capillary blush, (b) time to washout for each image sequence and (c) time duration of arterial, capillary and venous phases. Further, processor 15 provides data comprising a plot of average luminance intensity value against time for a common image area of each image of the first and second image sequences where the images are synchronized in response to an identified contrast entrance image of each image sequence and indicating differences between the luminance values of the images. Contrast agent detector 23 analyzes and processes data representing the first image sequence and the second image sequence to identify a first contrast image, in both the first image sequence and the second image sequence, indicating presence of the contrast agent by comparing a difference between measures representative of luminance content of the first contrast image and a mask image with a threshold. The mask image is an image preceding the first contrast image and substantially exclusive of an indication of presence of the contrast agent. The process of FIG. 19 terminates at step 431.

A processor as used herein is a computer, processing device, logic array or other device for executing machine-readable instructions stored on a computer readable medium, for performing tasks and may comprise any one or combination of, hardware and firmware. A processor may also comprise memory storing machine-readable instructions executable for performing tasks. A processor acts upon information by manipulating, analyzing, modifying, converting or transmitting information for use by an executable procedure or an information device, and/or by routing the information to an output device. A processor may use or comprise the capabilities of a controller or microprocessor, for example, and is conditioned using executable instructions to perform special purpose functions not performed by a general purpose computer. A processor may be coupled (electrically and/or as comprising executable components) with any other processor enabling interaction and/or communication there-between. A display processor or generator is a known element comprising electronic circuitry or software or a combination of both for generating display images or portions thereof.

An executable application, as used herein, comprises code or machine readable instructions for conditioning the processor to implement predetermined functions, such as those of an operating system, a context data acquisition system or other information processing system, for example, in response to user command or input. An executable procedure is a segment of code or machine readable instruction, sub-routine, or other distinct section of code or portion of an executable application for performing one or more particular processes. These processes may include receiving input data and/or parameters, performing operations on received input data and/or performing functions in response to received input parameters, and providing resulting output data and/or parameters. A user interface (UI), as used herein, comprises one or more display images, generated by a display processor and enabling user interaction with a processor or other device and associated data acquisition and processing functions.

The UI also includes an executable procedure or executable application. The executable procedure or executable application conditions the display processor to generate signals representing the UI display images. These signals are supplied to a display device which displays the image for viewing by the user. The executable procedure or executable application further receives signals from user input devices, such as a keyboard, mouse, light pen, touch screen or any other means allowing a user to provide data to a processor. The processor, under control of an executable procedure or executable application, manipulates the UI display images in response to signals received from the input devices. In this way, the user interacts with the display image using the input devices, enabling user interaction with the processor or other device. The functions and process steps herein may be performed automatically or wholly or partially in response to user command. An activity (including a step) performed automatically is performed in response to executable instruction or device operation without user direct initiation of the activity.

The system and processes of FIGS. 1-19 are not exclusive. Other systems, processes and menus may be derived in accordance with the principles of the invention to accomplish the same objectives. Although this invention has been described with reference to particular embodiments, it is to be understood that the embodiments and variations shown and described herein are for illustration purposes only. Modifications to the current design may be implemented by those skilled in the art, without departing from the scope of the invention. A system aligns angiographic images of image sequences in space, time, and luminance enabling comparative review of registered images and direct comparison of two Angiographic or DSA images of substantially the same portion of anatomy obtained at substantially the same imaging angle and with substantially the same contrast bolus geometry. Further, the processes and applications may, in alternative embodiments, be located on one or more (e.g., distributed) processing devices on a network linking the units of FIG. 1. Any of the functions and steps provided in FIGS. 1-19 may be implemented in hardware, software or a combination of both.

What is claimed is:

1. A system for automatically processing different medical image sequences facilitating comparison of the sequences in adjacent respective display areas for use in Angiography or another medical procedure, comprising:
   an imaging system for storing first and second sets of data at different stages of a treatment procedure representing corresponding first and second image sequences individually comprising a plurality of temporally sequential individual images of vessels of a portion of patient anatomy, said sequential individual images encompassing introduction of a contrast agent into patient vessels;
   an image data processor for,
      identifying first and second mask images of said first and second image sequences respectively as images preceding introduction of contrast agent,
      determining a translational shift between said first and second mask images and
      transforming data representing individual images of at least one of the first image sequence and the second image sequence in response to the determined translational shift to reduce mis-alignment of said individual images of said first image sequence relative to said individual images of said second image sequence; and
   a display for presenting first and second image sequences corrected for mis-alignment, in substantially adjacent display areas to facilitate user comparison.

2. A system according to claim 1, wherein
said image data processor identifies an image area common to the individual images of said first and second image sequences and applies said determined translational shift to the common image area.

3. A system according to claim 2, wherein
said image data processor excludes application of said determined translational shift to image areas external to said common image area.

4. A system according to claim 1, wherein
said image data processor transforms luminance intensity data representing individual images of at least one of the first image sequence and the second image sequence to improve luminance intensity range matching between the sequences, in response to a comparison of luminance intensity content of an image of said first image sequence with an image of said second image sequence.

5. A system according to claim 4, wherein
said image data processor transforms said luminance intensity data using a luminance transfer function derived from histograms of said image of said first image sequence and said image of said second image sequence, said histograms indicating numbers of pixels in an image having particular luminance intensity values or value ranges.

6. A system according to claim 5, wherein
said image data processor identifies an image area common to the images of said first and second image sequences and applies said luminance transfer function to image pixel data of the common image area.

7. A system according to claim 5, wherein
said image of said first image sequence and said image of said second image sequence comprise said first and second mask images respectively.

8. A system according to claim 1, wherein
said imaging system stores the first image sequence together with data identifying settings used in acquiring the first image sequence and said settings are used in acquiring said second image sequence, said settings comprising data indicating at least one of, (a) an imaging plane position and angle, (b) imaging position, (c) radiation source to image detector distance, (d) patient anatomy imaged, (e) patient position and (f) contrast agent bolus injection profile.

9. A system according to claim 1, wherein
said imaging system stores the first image sequence together with data identifying settings used by an image acquisition device in acquiring the first image sequence and said settings are used in acquiring said second image sequence, said settings comprising data indicating at least one of, (a) X-ray tube voltage, (b) image resolution and (c) radiation dosage.

10. A system according to claim 1, wherein
said image data processor,
   determines a plurality of first translational shifts between said first mask image and a corresponding plurality of images of said first image sequence,
   determines a plurality of second translational shifts between said second mask image and a corresponding plurality of images of said second image sequence,
   transforms data representing individual images of the first image sequence in response to the determined plurality of first translational shifts and
   transforms data representing individual images of the second image sequence in response to the determined plurality of second translational shifts.

11. A system according to claim 10, wherein
said image data processor,
   identifies an image area common to the individual images of said first image sequence,
   transforms data representing the identified common area of said individual images of the first image sequence in response to the determined plurality of first translational shifts,
   identifies an image area common to the individual images of said second image sequence,
   transforms data representing the identified common area of said individual images of the second image sequence in response to the determined plurality of second translational shifts.

12. A system according to claim 11, wherein
said image data processor excludes application of said determined translational shift to image areas external to the common image areas.

13. A system according to claim 11, wherein
said display exclusively presents the common image areas of the first and second image sequences.

14. A system according to claim 1, including
a contrast agent detector for processing data representing said first image sequence and said second image sequence to identify a first contrast image indicating presence of said contrast agent and a mask image as an image preceding said first contrast image and being substantially exclusive of an indication of presence of said contrast agent, by comparing a difference between measures representative of luminance content of the first contrast image and a mask image, with a threshold.

15. A system according to claim 1, wherein
a contrast agent detector for automatically analyzing said first and second image sequences to identify a first image frame, in both the first image sequence and the second image sequence, indicating presence of a contrast agent; and
a display processor for automatically synchronizing presentation of the first image sequence and the second image sequence in said substantially adjacent display areas in response to identification of said first image frame and relative to introduction of contrast agent and enabling a user to synchronously increment through image frames of both said first image sequence and said second image sequence, one image frame at a time.

16. A system according to claim 1, wherein
in response to a user initiated change of luminance intensity of an image of said first image sequence, said image data processor transforms luminance intensity data representing individual images of the second image sequence to improve luminance intensity range matching between the sequences, in response to a comparison of luminance intensity content of an image of said first image sequence with an image of said second image sequence.

17. A system according to claim 1, wherein
in response to a user initiated change of cursor position in an image of said first image sequence, said image data processor automatically repositions a cursor to a corresponding position in a corresponding image of said second image sequence.

18. A system according to claim 1, wherein
in response to a user addition of ancillary information to a particular feature in an image of said first image sequence, said image data processor automatically adds corresponding ancillary information to a corresponding particular feature in a corresponding image of said second image sequence.

19. A system according to claim 18, wherein
said ancillary information comprises at least one of (a) an annotation, (b) an image related measurement and "(c) an analysis of image content for individual pixels or a group of pixels contained within a region of interest (ROI)".

20. A system according to claim 1, wherein
said first image sequence and said second image sequence comprise DSA (digital subtraction angiography) images and
said first image sequence is obtained using a first administration of a contrast agent prior to an interventional procedure and said second image sequence is obtained using a second administration of a contrast agent following an interventional procedure and
said substantially adjacent display areas enable a user to synchronously increment and compare before and after procedure medical images.

21. A system according to claim 1, wherein
said first image sequence is obtained using a first administration of a contrast agent on a first occasion and said second image sequence is obtained using a second administration of a contrast agent on a second occasion after the first image sequence is obtained and
said substantially adjacent display areas enable a user to synchronously increment and compare said first and second image sequences.

22. A system according to claim 1, including
a display processor for automatically synchronizing presentation of said first image sequence and said second image sequence in response to at least one of, (a) a heart cycle signal and (b) a respiratory motion indicative signal.

23. A system according to claim 22, wherein
said display processor automatically synchronizes presentation of said first image sequence and said second image sequence in respective areas of said substantially adjacent display areas based on an image frame synchronized with a heart cycle signal and closest to time of introduction of contrast agent.

24. A system according to claim 1, wherein
said image data processor performs a vessel phase analysis of images to determine and display data indicating relative amount of time contrast agent spends in arterial, capillary and venous phases for a plurality of image sequences synchronized to a particular image frame.

25. A system according to claim 1, wherein
said image data processor provides data indicating at least one of, (a) time to maximum capillary blush, (b) time to washout for each image sequence and (c) time duration of arterial, capillary and venous phases.

26. A system according to claim 1, wherein
said image data processor provides data comprising a plot of average luminance intensity value against time for a common image area of each image of said first and second image sequences where the images are synchronized in response to an identified contrast entrance image of each image sequence and indicating differences between the luminance values of the images.

27. A system according to claim 1, wherein
said image data processor provides data comprising histograms of the common image area of the displayed images for said first and second image sequences.

28. A system according to claim 1, wherein
said translational shift comprises a non-linear geometric transformation.

29. A method for automatically processing different medical image sequences facilitating comparison of the sequences in adjacent respective display areas for use in Angiography or another medical procedure, comprising the activities of:
storing first and second sets of data at different stages of a treatment procedure representing corresponding first and second image sequences individually comprising a plurality of temporally sequential individual images of vessels of a portion of patient anatomy, said sequential individual images encompassing introduction of a contrast agent into patient vessels;
transforming luminance intensity data representing individual images of at least one of the first image sequence and the second image sequence to improve luminance intensity range matching between the sequences, in response to a comparison of luminance intensity content of an image of said first image sequence with an image of said second image sequence; and presenting first and second image sequences with improved luminance intensity range matching in substantially adjacent display areas to facilitate user comparison.

30. A method according to claim 29, including the activities of identifying first and second mask images of said first and second image sequences respectively as images preceding introduction of contrast agent, determining a translational shift between said first and second mask images and transforming data representing individual images of at least one of the first image sequence and the second image sequence in response to the determined translational shift to reduce mis-alignment of said individual images of said first image sequence relative to said individual images of said second image sequence.

31. A method for automatically processing different medical image sequences facilitating comparison of the sequences in adjacent respective display areas for use in Angiography or another medical procedure, comprising the activities of:

storing first and second sets of data at different stages of a treatment procedure representing corresponding first and second image sequences individually comprising a plurality of temporally sequential individual images of vessels of a portion of patient anatomy, said sequential individual images encompassing introduction of a contrast agent into patient vessels;

identifying first and second mask images of said first and second image sequences respectively as images preceding introduction of contrast agent;

determining a translational shift between said first and second mask images;

transforming data representing individual images of at least one of the first image sequence and the second image sequence in response to the determined translational shift to reduce mis-alignment of said individual images of said first image sequence relative to said individual images of said second image sequence; and presenting first and second image sequences corrected for mis-alignment, in substantially adjacent display areas to facilitate user comparison.

32. A method according to claim 31, including the activities of performing a vessel phase analysis of images and determining and displaying data indicating relative amount of time contrast agent spends in arterial, capillary and venous phases for a plurality of image sequences synchronized to a particular image frame.

33. A method according to claim 31, including the activity of storing at least one of (a) data representing results of comparing the corrected first and second image sequences, (b) translational shift data and (c) data identifying an image area common to the individual images of said first and second image sequences.

* * * * *